United States Patent
Handa et al.

(10) Patent No.: US 8,378,033 B2
(45) Date of Patent: Feb. 19, 2013

(54) PROCESS FOR PRODUCTION OF WATER-ABSORBABLE RESIN PARTICLE, AND WATER-ABSORBABLE RESIN PARTICLE PRODUCED BY THE PROCESS

(75) Inventors: Masayoshi Handa, Himeji (JP); Yasuhiro Nawata, Kako-gun (JP)

(73) Assignee: Sumitomo Seika Chemicals Co., Ltd., Kako-gun (JP)

( * ) Notice: Subject to any disclaimer, the term of this patent is extended or adjusted under 35 U.S.C. 154(b) by 188 days.

(21) Appl. No.: 12/297,057

(22) PCT Filed: Apr. 20, 2007

(86) PCT No.: PCT/JP2007/058579
§ 371 (c)(1), (2), (4) Date: Oct. 14, 2008

(87) PCT Pub. No.: WO2007/123188
PCT Pub. Date: Nov. 1, 2007

(65) Prior Publication Data
US 2009/0281247 A1    Nov. 12, 2009

(30) Foreign Application Priority Data
Apr. 24, 2006  (JP) .................................. 2006-119891

(51) Int. Cl.
*B01J 20/26* (2006.01)
*C08F 2/18* (2006.01)
*C08F 20/06* (2006.01)

(52) U.S. Cl. ........ 525/267; 525/243; 525/298; 525/301; 526/66; 526/78; 526/213; 526/317.1; 428/402

(58) Field of Classification Search .................. 525/242, 525/243, 244, 298, 301, 267; 526/65, 66, 526/78, 79, 87, 89, 213, 317.1, 909, 930; 428/402
See application file for complete search history.

(56) References Cited

U.S. PATENT DOCUMENTS

| | | | |
|---|---|---|---|
| 5,180,798 A | 1/1993 | Nakamura et al. | |
| 5,412,037 A | 5/1995 | Rebre et al. | |
| 5,548,047 A | 8/1996 | Ito et al. | |
| 5,652,309 A | 7/1997 | Itoh et al. | |
| 2006/0194055 A1 * | 8/2006 | Matsuda et al. | ............... 428/402 |
| 2007/0179261 A1 * | 8/2007 | Uda et al. | ....................... 526/193 |

FOREIGN PATENT DOCUMENTS

| | | |
|---|---|---|
| JP | 3-227301 | 10/1991 |
| JP | 5-17509 | 1/1993 |
| JP | 9-12613 | 1/1997 |
| JP | 9-77810 | 3/1997 |
| JP | 9-143210 | 6/1997 |
| JP | 9-239912 | 9/1997 |
| JP | 2006-89525 | 4/2006 |
| WO | WO 2004083284 A1 * | 9/2004 |
| WO | WO 2005063825 A1 * | 7/2005 |

* cited by examiner

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

The present invention relates to a method of producing water-absorbent resin particles in which a median particle size of primary particles (d) and a median particle size of secondary particles (D) satisfy the relationship of the formula, $5d/3+150<D<5d+150$, comprising the steps of:
(1) subjecting a water-soluble ethylenically unsaturated monomer to a first-step reversed phase suspension polymerization reaction, in a petroleum hydrocarbon solvent, in the presence of a dispersion stabilizer, to give spherical primary particles having a median particle size (d) of from 30 to 130 μm;
(2) cooling the polymerization reaction solution, to precipitate the dispersion stabilizer; and
(3) carrying out a second-step reversed phase suspension polymerization reaction by adding the water-soluble ethylenically unsaturated monomer for the second step to the polymerization reaction solution to agglomerate the primary particles, to give secondary particles having a median particle size (D) of from 200 to 500 μm.

8 Claims, 2 Drawing Sheets

PROCESS FOR PRODUCTION OF WATER-ABSORBABLE RESIN PARTICLE, AND WATER-ABSORBABLE RESIN PARTICLE PRODUCED BY THE PROCESS

TECHNICAL FIELD

The present invention relates to a method of producing water-absorbent resin particles. More specifically, the present invention relates to a method of producing water-absorbent resin particles having an appropriate particle size, a narrow particle size distribution, a high particle strength, and an excellent water absorption capacity under pressure, as properties suitable for a water-absorbent agent used in a hygienic material; and water-absorbent resin particles obtainable by the method.

BACKGROUND ART

In recent years, a water-absorbent resin has been widely used in various fields such as hygienic articles such as disposable diaper and sanitary articles; agricultural and horticultural materials such as water-retaining agents and soil conditioners; and industrial and construction materials such as water blocking agents and dewfall preventing agents. Among these fields, it is frequently used especially for hygienic articles such as disposable diaper and sanitary articles.

As the water-absorbent resins, there have been known, for example, hydrolysates of starch-acrylonitrile graftcopolymers, neutralized products of starch-acrylate graftcopolymers, saponified products of vinyl acetate-acrylic ester copolymers, partially neutralized products of polyacrylic acid, and the like.

Generally, properties desired for the water-absorbent resin include a large amount of water absorption, an excellent water-absorption rate, a high gel strength after water absorption, and the like. Particularly, properties desired for the water-absorbent resin used in an absorbent material applied to a hygienic material include, in addition to a large amount of water absorption, an excellent water-absorption rate, and a high gel strength after water absorption, an excellent water absorption capacity under pressure, an appropriate particle size, a narrow particle size distribution, a small amount of rewet of the absorbed substance to the external of the absorbent material, an excellent dispersibility of the absorbed substance to the internal of the absorbent material, and the like.

Further, in recent years, with an absorbent material for use in a hygienic material such as disposable diaper or sanitary napkin being thinner and a manufacturing line being speeded up, it has been desired for water-absorbent resin particles that the particles do not break down even being exposed to a high pressure or a strong collision which has not been assumed so far, in other words, a high particle strength.

For example, an absorbent material for disposal diaper is generally manufactured by vacuuming water-absorbent resin particles and fibrous pulps on a metal mesh to laminate into layers with mixing in the air, in an equipment called a drum former. Thereafter, the absorbent material was compressed by a roller press or the like to maintain its shape and increase strength. In the manufacture of a thin absorbent material, the absorbent material is compressed by a higher pressure than that of the conventional absorbent material, and additionally, the amount of the pulp used is lowered. Therefore, a high force is loaded to the water-absorbent resin particles, whereby a breakdown of the particles tends to take place.

Further, a speed-up of a manufacturing line of the absorbent material to increase in productivity progresses, so that, in the above drum former, a speed at which the water-absorbent resin particles collide to the metal mesh and a supporting plate at the periphery thereof is increased, and the water-absorbent resin particles receive a collision higher than ever before, whereby the particles also tend to be broken down.

When a breakdown of the water-absorbent resin particles takes place, water absorption property gets lower. Therefore, there have been desired the water-absorbent resin particles in which particle strength against collision is high and the water absorption property doesn't get lower.

The water-absorbent resin is mainly produced by subjecting a water-soluble ethylenically unsaturated monomer to a reversed phase suspension polymerization or an aqueous solution polymerization. However, there have been disadvantages in a conventional reversed phase suspension polymerization method that water-absorbent resin particles having a large particle size are less likely to be produced, and an appropriate particle size that is suitable for a hygiene material is less likely to be obtained.

Therefore, in order to obtain water-absorbent resin particles having a large particle size, some manufacturing techniques have been suggested. For example, there have been suggested, in production methods according to a reversed phase suspension polymerization, a method comprising producing water-absorbent resin particles according to a polymerization of the monomer for the first step, thereafter, cooling the particles, again adding a monomer to the polymerization reaction solution in which the polymer particles in the first step are suspended, in a state a surfactant is precipitated, and polymerizing the mixture, to give large water-absorbent resin particles (Patent Publication 1), a method comprising producing water-absorbent resin particles according to a polymerization of the monomer for the first step, thereafter again adding a monomer to the polymerization reaction solution in which the polymer particles are suspended, and polymerizing the mixture, to agglomerate the polymer particles in the first step (Patent Publication 2), a method comprising producing water-absorbent resin particles according to a polymerization of the monomer for the first step, thereafter adding a specific surfactant having an HLB of 7 or more to the polymerization reaction solution in which the polymer particles are suspended, then again adding a monomer thereto, and polymerizing the mixture, to give large water-absorbent resin particles (Patent Publication 3), a method comprising producing water-absorbent resin particles according to a polymerization of the monomer for the first step, thereafter again adding a monomer to the polymerization reaction solution in which the polymer particles are suspended, in the presence of inorganic powders, and polymerizing the mixture, to give large water-absorbent resin particles (Patent Publication 4), and the like.

According to the above techniques, water-absorbent resin having a large particle size was obtained but did not sufficiently satisfy an appropriate particle size, a narrow particle size distribution, a high particle strength, and an excellent water absorption capacity under pressure.

Patent Publication 1: Japanese Patent Laid-Open No. Hei 3-227301

Patent Publication 2: Japanese Patent Laid-Open No. Hei 5-17509

Patent Publication 3: Japanese Patent Laid-Open No. Hei 9-12613

Patent Publication 4: Japanese Patent Laid-Open No. Hei 9-77810

DISCLOSURE OF INVENTION

Problems to be Solved by the Invention

An object of the present invention is to provide a method of producing water-absorbent resin particles having an appropriate particle size, a narrow particle size distribution, a high particle strength, and an excellent water absorption capacity under pressure, as suitable properties of a water-absorbent agent used in a hygienic material; and water-absorbent resin particles obtainable by the method.

Means to Solve the Problems

The present invention relates to a method of producing water-absorbent resin particles in which a median particle size of primary particles (d) and a median particle size of secondary particles (D) satisfy the relationship of the formula, $5d/3+150<D<5d+150$, comprising the steps of (1) subjecting a water-soluble ethylenically unsaturated monomer to a first-step reversed phase suspension polymerization reaction, in a petroleum hydrocarbon solvent, in the presence of a dispersion stabilizer, to give spherical primary particles having a median particle size (d) of from 30 to 130 μm, (2) cooling the polymerization reaction solution, to precipitate the dispersion stabilizer, and (3) carrying out a second-step reversed phase suspension polymerization reaction by adding the water-soluble ethylenically unsaturated monomer for the second step to the polymerization reaction solution to agglomerate the primary particles, to give secondary particles having a median particle size (D) of from 200 to 500 μm; and water-absorbent resin particles obtainable by the method.

Effects of the Invention

According to the present invention, water-absorbent resin particles having an appropriate particle size, a narrow particle size distribution, a high particle strength, and an excellent water absorption capacity under pressure can be produced, and the resulting water-absorbent resin particles can be suitably used even in the production of a thin absorbent material, without lowering its properties.

BEST MODE FOR CARRYING OUT THE INVENTION

The production method of the present invention is carried out by a two-step reversed phase suspension polymerization reaction. The present invention is explained hereinbelow as one example of the embodiment, but is not limited only to those exemplified ones.

Specifically, in the method of producing a water-absorbent resin by subjecting a water-soluble ethylenically unsaturated monomer to a reversed phase suspension polymerization, in a petroleum hydrocarbon solvent, in the presence of a surfactant as a dispersion stabilizer, using a polymeric dispersing agent as a dispersion stabilizer together as desired, the aqueous solution of the water-soluble ethylenically unsaturated monomer for the first step is subjected to a reversed phase suspension polymerization reaction using a radical polymerization initiator while stirring, in the presence of a crosslinking agent as desired, in the presence of a water-soluble thickener as desired, to give spherical primary particles having a median particle size (d) of from 30 to 130 μm. Thereafter, the polymerization reaction solution is cooled such that the dispersion stabilizer is in a state of precipitation, and a second-step reversed phase suspension polymerization reaction is carried out by adding thereto an aqueous solution of the monomer for the second step containing preferably 90 to 200 parts by mass of a monomer based on 100 parts by mass of the monomer for the first step, a radical polymerization initiator, and a crosslinking agent as desired, to give secondary particles in an agglomerate form of the primary particles, wherein the secondary particles have a median particle size (D) of from 200 to 500 μm, and the relationship between a median particle size of primary particles (d) and a median particle size of secondary particles (D) is within the range of the formula, $5d/3+150<D<5d+150$, whereby water-absorbent resin particles having an appropriate particle size, a narrow particle size distribution, and a high particle strength are obtained.

The water-soluble ethylenically unsaturated monomer used includes, for example, (meth)acrylic acid ("acryl-" and "methacryl-" as used herein collectively refer to "(meth)acryl-," hereinafter referred to the same), 2-(meth)acrylamide-2-methylpropanesulfonic acid and/or an alkali salt thereof; nonionic monomers such as (meth)acrylamide, N,N-dimethyl(meth)acrylamide, 2-hydroxyethyl (meth)acrylate, N-methylol(meth)acrylamide and polyethylene glycol mono (meth)acrylate; amino group-containing unsaturated monomers such as N,N-diethylaminoethyl (meth)acrylate, N,N-diethylaminopropyl (meth)acrylate, and diethylaminopropyl (meth)acrylamide or quaternary salts thereof; and the like. At least one member selected from these groups can be used. Among them, acrylic acid, methacrylic acid, or alkali salts thereof, acrylamide, methacrylamide, or N,N-dimethylacrylamide is preferably used. In addition, a monomer component used in the second and subsequent steps may include the monomer component which is the same as or different from the monomer component used in the first step.

The water-soluble ethylenically unsaturated monomer can be usually used in the form of an aqueous solution. It is preferable that the concentration of the monomer in the aqueous solution of the monomer is in the range of from 20% by mass to a saturated concentration.

When the water-soluble ethylenically unsaturated monomer has an acid group as (meth)acrylic acid and 2-(meth)acrylamide-2-methylpropanesulfonic acid, the acid group may be previously neutralized with an alkaline neutralizing agent such as an alkali metal salt. The alkaline neutralizing agent as mentioned above includes aqueous solutions of sodium hydroxide, potassium hydroxide, ammonium hydroxide, and the like. These alkaline neutralizing agents may be used alone or in combination.

The degree of neutralization of all the acid groups with the alkaline neutralizing agent is preferably in the range of from 10 to 100% by mol, and more preferably in the range of from 30 to 80% by mol, from the viewpoint of increasing osmotic pressure to increase absorption capacity of the resulting water-absorbent resin particles, and not causing any disadvantages in safety or the like due to the presence of an excess alkaline neutralizing agent.

The radical polymerization initiator added to the aqueous solution of the monomer includes, for example, persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutylate, t-butyl peroxypivalate, and hydrogen peroxide; azo compounds such as 2,2'-azobis[2-(N-phenylamidino)propane]dihydrochloride, 2,2'-azobis[2-(N-allylamidino)propane]dihydrochloride, 2,2'-azobis{2-[1-(2-hydroxyethyl)-2-imidazoline-2-yl]propane} dihydrochloride, 2,2'-azobis {2-methyl-N-[1,1-bis(hydroxymethyl)-

2-hydroxyethyl]propionamide}, 2,2'-azobis[2-methyl-N-(2-hydroxyethyl)-propionamide], and 4,4'-azobis(4-cyanovaleric acid); and the like. These radical polymerization initiators may be used alone or in combination of two or more kinds.

The radical polymerization initiator is usually used in an amount of from 0.005 to 1% by mol, based on the total amount of the monomer. When the amount used is less than 0.005% by mol, it is not preferable since a long time is required for the polymerization reaction. When the amount used is more than 1% by mol, it is not preferable since an abrupt polymerization reaction takes place.

The above-mentioned radical polymerization initiator can be also used as a redox polymerization initiator together with a reducing agent such as sodium sulfite, sodium hydrogen sulfite, ferrous sulfate, and L-ascorbic acid.

In addition, in order to control water absorption property of the water-absorbent resin particles, a chain transfer agent may be added. As the above-mentioned chain transfer agents, hypophosphites, thiols, thiolic acids, secondary alcohols, amines, and the like can be exemplified.

A crosslinking agent may be added as occasion demands to the above-mentioned aqueous solution of the monomer, to carry out the polymerization. As the crosslinking agent (internal crosslinking agent) added to the aqueous solution of the monomer before the polymerization reaction, for example, compounds each having two or more polymerizable unsaturated groups can be used. The crosslinking agent includes, for example, di- or tri(meth)acrylate esters of polyols such as (poly)ethylene glycol [for example, "polyethylene glycol" and "ethylene glycol" as used herein are collectively described as "(poly)ethylene glycol," hereinafter referred to the same], (poly)propylene glycol, trimethylolpropane, glycerol polyoxyethylene glycol, polyoxypropylene glycol, and (poly)glycerol; unsaturated polyesters obtained by reacting the above-mentioned polyol with an unsaturated acid such as maleic acid and fumaric acid; bisacrylamides such as N,N'-methylenebis(meth)acrylamide; di- or tri(meth)acrylate esters obtained by reacting a polyepoxide with (meth)acrylic acid; carbamyl esters of di(meth)acrylic acid obtained by reacting a polyisocyanate such as tolylene diisocyanate or hexamethylene diisocyanate with hydroxyethyl (meth)acrylate; allylated starch; allylated cellulose; diallyl phthalate; N,N',N"-triallyl isocyanurate; divinylbenzene; and the like.

In addition, as the internal crosslinking agent, in addition to the above-mentioned compounds each having two or more polymerizable unsaturated groups, compounds each having two or more other reactive functional groups can be used. The internal crosslinking agent includes, for example, glycidyl group-containing compounds such as (poly)ethylene glycol diglycidyl ether, (poly)propylene glycol diglycidyl ether, and (poly)glycerol diglycidyl ether; (poly)ethylene glycol; (poly)propylene glycol; (poly)glycerol; pentaerythritol; ethylenediamine; polyethyleneimine; glycidyl (meth)acrylate; and the like. These internal crosslinking agents may be used in combination of two or more kinds.

The internal crosslinking agent is added in an amount of preferably 1% by mol or less, and more preferably 0.5% by mol or less, based on the total amount of the monomer, from the viewpoint of sufficiently enhancing absorption property of the resulting water-absorbent resin particles. Here, the reason why the addition of the internal crosslinking agent is optional is that the water absorption capacity of the water-absorbent resin particles can be controlled also by adding a crosslinking agent for subjecting the particles to crosslinking on their surface or near their surface in any steps from after the polymerization of the monomers to drying.

The petroleum hydrocarbon solvent used as dispersion medium includes, for example, aliphatic hydrocarbons such as n-hexane, n-heptane, n-octane, and ligroin; alicyclic hydrocarbons such as cyclopentane, methylcyclopentane, cyclohexane, and methylcyclohexane; aromatic hydrocarbons such as benzene, toluene, and xylene; and the like. Among them, n-hexane, n-heptane, and cyclohexane are suitably used since these are industrially easily available, stable in quality and inexpensive. These petroleum hydrocarbon solvents may be used alone or can be used in admixture of two or more kinds.

The surfactant as a dispersion stabilizer used includes, for example, sucrose fatty acid esters, polyglycerol fatty acid esters, sorbitan fatty acid esters, polyoxyethylene sorbitan fatty acid esters, polyoxyethylene glycerol fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene hydrogenated castor oil, alkylallylformaldehyde condensed polyoxyethylene ethers, polyoxyethylene polyoxypropylene block copolymer, polyoxyethylene polyoxypropyl alkyl ethers, polyethylene glycol fatty acid esters, alkyl glucosides, N-alkyl glucone amides, polyoxyethylene fatty acid amides, polyoxyethylene alkylamines, phosphoric esters of polyoxyethylene alkyl ethers, and phosphoric esters of polyoxyethylene alkylallyl ethers, and the like.

Among them, sucrose fatty acid esters, polyglycerol fatty acid esters, sorbitan fatty acid esters, polyoxyethylene sorbitan fatty acid esters, polyoxyethylene glycerol fatty acid esters, and polyoxyethylene hydrogenated castor oil are preferable, from the viewpoint of dispersion stability of the aqueous solution of the monomer. Further, sucrose fatty acid esters and polyglycerol fatty acid esters are most preferably used, from the viewpoint of particle size, particle size distribution, and particle strength of the resulting agglomerated particles. These surfactants as dispersion stabilizers may be used alone or in combination of two or more kinds.

In addition, as the dispersion stabilizer, a polymeric dispersing agent may be used together with the above-mentioned surfactant. The polymeric dispersing agent used includes maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, ethylene-maleic anhydride copolymer, ethylene-propylene-maleic anhydride copolymer, butadiene-maleic anhydride copolymer, oxidized polyethylene, ethylene-acrylic acid copolymer, ethyl cellulose, ethyl hydroxyethyl cellulose, and the like. Among them, maleic anhydride-modified polyethylene, maleic anhydride-modified polypropylene, maleic anhydride-modified ethylene-propylene copolymer, oxidized polyethylene, and ethylene-acrylic acid copolymer are preferable, from the viewpoint of dispersion stability of the aqueous solution of the monomer. These polymeric dispersing agents may be used alone or in combination of two or more kinds.

A shape of the primary particles is a single particle of spherical shape with smooth surface, such as true spherical shape, or elliptic spherical shape. In order to obtain spherical water-absorbent resin particles as mentioned above, HLB (hydrophile-lipophile balance) of a dispersion stabilizer is generally used as an index. HLB is not particularly limited since the range of HLB at which spherical particles are obtained differs depending upon the kind of dispersion stabilizer used.

For example, in the case of a sucrose fatty acid ester, spherical particles are obtained by using a dispersion stabilizer having an HLB of 5 or less. When the primary particles are spherical, a shape of the surface is smooth, and also the agglomerated secondary particles are likely to be closely filled, so that the particles are less likely to be broken down even receiving a collision, and water-absorbent resin particles having a high particle strength are obtained.

These dispersion stabilizers are used in an amount of from 0.1 to 5 parts by mass, and preferably from 0.2 to 3 parts by mass, based on 100 parts by mass of the aqueous solution of the monomer for the first step, in order to favorably keep dispersion state of the aqueous solution of the monomer and obtain an dispersion effect accounting to the amount used, in a petroleum hydrocarbon solvent.

The reaction temperature of the polymerization reaction differs depending upon the radical polymerization initiator used. The reaction temperature is usually from 20° to 110° C., and preferably from 40° to 90° C. When the reaction temperature is lower than 20° C., the polymerization rate gets lower and the polymerization time gets longer, so that it is not economically preferable. When the reaction temperature is higher than 110° C., it would be difficult to remove heat of polymerization, so that it would be difficult to smoothly carry out the reaction.

In the production method of the present invention, the control of the particle size of the primary particles during the first-step polymerization can be carried out, for example, by changing the rotational speed of stirring during the polymerization reaction using the various kinds of stirring blades. As the stirring blades, it is possible to used, for example, a propeller blade, a paddle blade, an anchor blade, a turbine blade, a Phaudler blade, a ribbon blade, a Fullzone blade (manufactured by Shinko Pantec Co., Ltd.), a MAXBLEND blade (manufactured by Sumitomo Heavy Industries, Ltd.), a Super-Mix blade (manufactured by Satake Chemical Equipment Mfg., Ltd.), and the like. Usually, when the same kinds of stirring blades are used, the higher the rotational speed of stirring, the smaller the particle size of the primary particles.

In addition, the particle size of the primary particles can be adjusted also by adding a thickener to the aqueous solution of the monomer for the first step to change the viscosity of the aqueous solution. As the thickener, for example, hydroxyethyl cellulose, hydroxypropyl cellulose, methyl cellulose, carboxymethyl cellulose, polyacrylic acid, (partially) neutralized products of polyacrylic acid, polyethylene glycol, polyacrylamide, polyethylene imine, dextrin, sodium alginate, polyvinyl alcohol, polyvinyl pyrrolidone, polyethylene oxide, or the like can be used. Usually, when the rotational speeds of stirring are the same, the higher the viscosity of the aqueous solution of the monomer, the larger the particle size of the primary particles.

Accordingly, spherical primary particles having a median particle size (d) of from 30 to 130 μm are obtained. Among them, the median particle size is preferably from 40 to 120 μm, further preferably from 50 to 110 μm, and particularly preferably from 50 to 100 μm, so that effects of the present invention are increased.

The primary particles having the median particle size as mentioned above are selected, whereby the primary particles closely agglomerate after the second-step polymerization, so that the secondary particles having a high agglomerative strength, an appropriate particle size, and a narrow particle size distribution are obtained.

When the primary particles have a median particle size of smaller than 30 μm, it is not preferable because the particle size of the secondary particles gets too small, and the particle size distribution gets wider. In addition, when the primary particles have a median particle size of larger than 130 μm, it is not preferable because the particle size of the secondary particles gets too large, and the agglomerative strength gets lower.

As a method of controlling the particle size of the secondary particles, for example, the ratio of the monomer for the second step used, based on the water-soluble ethylenically unsaturated monomer for the first step, is varied, or the cooling temperature after the first-step polymerization is varied, to change the degree of precipitation of the dispersion stabilizer, whereby the particle size of the secondary particles can be adjusted.

In the present invention, the water-soluble ethylenically unsaturated monomer used in the second step is added in an amount of preferably from 90 to 200 parts by mass, more preferably from 110 to 180 parts by mass, and even more preferably from 120 to 160 parts by mass, based on 100 parts by mass of the monomer for the first step. When the water-soluble ethylenically unsaturated monomer for the second step is added in an amount of less than 90 parts by mass, a monomer required for agglomeration of the primary particles runs short, so that particle size distribution gets wider, and agglomerative strength of the particles tends to get weaker. In addition, when the water-soluble ethylenically unsaturated monomer for the second step is added in an amount of more than 200 parts by mass, a polymer of fine particles is generated from excess monomer, so that particle size distribution tends to get wider.

In a step of cooling the polymerization reaction solution in the first step, to precipitate the dispersion stabilizer, the cooling temperature is not particularly limited because the precipitation temperature of the dispersion stabilizer differs depending upon the kinds of the dispersion stabilizer or the kinds of a solvent. Usually, the cooling temperature is from 100 to 50° C., and white turbidity is seen by precipitation, so that the cooling temperature can be determined visually or according to a turbidimeter.

The secondary particles obtained according to the production method of the present invention have a median particle size (D) of in the range of from 200 to 500 μm, and preferably from 250 to 450 μm.

When the secondary particles have a median particle size of smaller than 200 μm and are used in an absorbent material or the like, it is not preferable because a phenomenon in which diffusion of liquid is inhibited, in other words, gel blocking, is likely to take place, and uniformity is impaired due to transfer of the particles. When the secondary particles have a median particle size of larger than 500 μm and are used in an absorbent material or the like, it is not preferable because the absorbent material is likely to be partially hard, and flexibility is impaired.

Further, the median particle size of the secondary particles (D), based on the median particle size of the primary particles (d), is within the range of the formula, $5d/3+150<D<5d+150$.

Here, when the particle size of the secondary particles is smaller than the above range, the number of the primary particles that are agglomerated is too small, so that the particle size distribution of the secondary particles is susceptible to a particle size distribution of the primary particles, and a particle size distribution of the secondary particles gets wider, and additionally the primary particles are less likely to closely agglomerate, and particle strength gets lower, therefore, it is not preferable. On the other hand, when the particle size of the secondary particles is larger than the above range, the number of the primary particles that are agglomerated gets too many, so that uniform agglomeration is less likely to be generated, and particle size distribution gets wider, therefore, it is not preferable.

In the present invention, a post-crosslinking treatment is carried out by adding a post-crosslinking agent in a step from after the second-step polymerization to drying, whereby an excellent water absorption capacity under pressure can be obtained.

The post-crosslinking agent as mentioned above can include compounds each having two or more reactive functional groups. Examples thereof include glycidyl group-containing compounds such as (poly)ethylene glycol diglycidyl ether, (poly)glycerol (poly)glycidyl ether, (poly)propylene glycol diglycidyl ether, and (poly)glycerol diglycidyl ether; (poly)ethylene glycol; (poly)propylene glycol; (poly)glycerol; pentaerythritol; ethylenediamine; polyethyleneimine; and the like. Among them, (poly)ethylene glycol diglycidyl ether, (poly)propylene glycol diglycidyl ether, and (poly)glycerol diglycidyl ether are particularly preferable. These post-crosslinking agents may be used alone or in combination of two or more kinds.

The post-crosslinking agent is added in an amount of preferably in the range of from 0.005% by mol to 1% by mol, and more preferably in the range of from 0.05% by mol to 0.5% by mol, based on the total amount of the monomer, from the viewpoint of not lowering the water absorption capacity of the resulting water-absorbent resin particles, and increasing a crosslinking density on their surface or near their surface to enhance the water absorption capacity under pressure.

The timing for adding the post-crosslinking agent is not particularly limited, as long as the post-crosslinking agent is added after the second-step polymerization. The post-crosslinking agent is added preferably in the presence of water in the range of from 1 to 400 parts by mass, more preferably in the presence of water in the range of from 5 to 200 parts by mass, and the most preferably in the presence of water in the range of from 10 to 100 parts by mass, based on 100 parts by mass of the solid content of the water-absorbent resin. As stated above, the water content upon addition of the post-crosslinking agent is controlled, whereby the water-absorbent resin particles are more comfortably subjected to crosslinking on their surface or near their surface, so that an excellent water absorption capacity under pressure can be achieved.

When the post-crosslinking agent is added, a hydrophilic organic solvent may be used as a solvent as occasion demands. The hydrophilic organic solvent includes, for example, lower alcohols such as methyl alcohol, ethyl alcohol, n-propyl alcohol and isopropyl alcohol; ketones such as acetone and methyl ethyl ketone; ethers such as diethyl ether, dioxane, and tetrahydrofuran; amides such as N,N-dimethylformamide; sulfoxides such as dimethyl sulfoxide; and the like. These hydrophilic organic solvents may be used alone or in combination of two or more kinds.

As mentioned above, the water-absorbent resin particles subjected to the post-crosslinking treatment after the polymerization are further dried. The final water content of the water-absorbent resin particles is 20% or less, and preferably from 5 to 10%. When the water content of the water-absorbent resin particles exceeds 20%, it is not preferable because flowability as powders gets lower.

The water absorbent-resin particles of the present invention thus obtained have an appropriate particle size, and also an excellent degree of uniformity of particle size distribution, a high retention rate of the particle size after particle collision test, and further an excellent water absorption capacity under pressure and retention rate of the water absorption capacity under pressure after particle collision test. Therefore, the absorbent-resin particles of the present invention are suitably used for an absorbent material or a hygiene material using the absorbent material.

Here, the uniformity degree of particle size distribution, the retention rate of the particle size after particle collision test, the water absorption capacity under pressure, and the retention rate of the water absorption capacity under pressure after particle collision test are determined according to the determination method described in Examples set forth below.

When the water absorbent-resin particles are used as a thin absorbent material, if large particles abound, it is not preferable because an absorbent material after compression gets partially hard, and if small particles abound, it is not preferable because the particles are likely to move in the absorbent material, and uniformity is impaired. Therefore, a narrower particle size distribution is preferable, and a smaller uniformity degree is good. From the above reasons, the uniformity degree of particle size distribution is suitably in the range of from 1.2 to 2.2, preferably in the range of from 1.2 to 2.0, and most preferably in the range of from 1.2 to 1.8.

When the water absorbent-resin particles are used in a thin absorbent material, those having a higher retention rate of the particle size after particle collision test are less likely to be broken down, and not only the uniformity degree of particle size distribution is maintained, but also a quality of the absorbent material is stabilized, and high properties can be maintained. Therefore, the retention rate of the particle size after particle collision test is preferably 80% or more, further preferably 85% or more, and most preferably 90% or more.

In addition, when the water absorbent-resin particles are used in a thin absorbent material, those having a higher water absorption capacity under pressure can absorb liquid also in an use under load. Therefore, the water absorption capacity under pressure is preferably 30 ml/g or more and further preferably 33 ml/g or more. Further, those having a higher retention rate of the water absorption capacity under pressure after particle collision test can maintain properties of the absorbent material. Therefore, the retention rate of the water absorption capacity under pressure after particle collision test is preferably 80% or more, further preferably 85% or more, and most preferably 90% or more.

EXAMPLES

The present invention will be further specifically described hereinbelow by Examples, and the present invention is not limited only to these Examples.

Example 1

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 9.2 mg of N,N'-methylenebisacrylamide were added thereto to dissolve, to prepare an aqueous monomer solution for the first step.

Setting the rotational speed of the stirrer at 450 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 85 μm.)

On the other hand, an another Erlenmeyer flask having a volume of 500 ml was charged with 128.8 g of an 80.5% by mass aqueous solution of acrylic acid, and 174.9 g of a 24.7% by mass aqueous sodium hydroxide was added dropwise thereto with cooling from external to neutralize 75% by mol. Thereafter, 0.16 g of potassium persulfate and 12.9 mg of N,N'-methylenebisacrylamide were added thereto to dissolve, to prepare an aqueous monomer solution for the second step, and the temperature of the solution was kept at about 25° C.

The rotational speed of stirring the above slurry after the polymerization was changed to 1000 rpm. Thereafter, the slurry was cooled to 25° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 264.7 g of water was distilled off to external of the system under refluxing n-heptane. Thereafter, 8.83 g of a 2% aqueous solution of ethylene glycol diglycidyl ether was added thereto, and the mixture was kept at 80° C. for 2 hours. Subsequently, n-heptane was evaporated, and the mixture was dried, to give 231.2 g of water-absorbent resin particles in an agglomerated form of the spherical particles. The secondary particles had a median particle size of 332 μm and a water content of 6.3%. The determination results of each property are shown in Table 1.

Example 2

The same procedures as in Example 1 were carried out except that the composition of the aqueous monomer solution during the second-step polymerization was changed to 174.8 g of an 80.5% by mass aqueous solution of acrylic acid, 237.4 g of a 24.7% by mass aqueous sodium hydroxide, 0.21 g of potassium persulfate and 17.5 mg of N,N'-methylenebisacrylamide, and further the amount of dehydration by a reflux of n-heptane after the second-step polymerization was changed to 313.9 g, and the amount of a 2% aqueous solution of ethylene glycol diglycidyl ether after the dehydration was changed to 10.7 g, to give 278.8 g of water-absorbent resin particles in an agglomerated form of the spherical particles. The secondary particles had a median particle size of 468 μm and a water content of 5.6%. The determination results of each property are shown in Table 1.

Example 3

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 9.2 mg of N,N'-methylenebisacrylamide were added thereto to dissolve, to prepare an aqueous monomer solution for the first step.

Setting the rotational speed of the stirrer at 500 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 60 μm.)

On the other hand, an another Erlenmeyer flask having a volume of 500 ml was charged with 147.2 g of an 80.5% by mass aqueous solution of acrylic acid, and 199.9 g of a 24.7% by mass aqueous sodium hydroxide was added dropwise thereto with cooling from external to neutralize 75% by mol. Thereafter, 0.18 g of potassium persulfate and 14.7 mg of N,N'-methylenebisacrylamide were added thereto to dissolve, to prepare an aqueous monomer solution for the second step, and the temperature of the solution was kept at about 25° C.

The rotational speed of stirring the above slurry after the polymerization was changed to 1000 rpm. Thereafter, the slurry was cooled to 25° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 284.5 g of water was distilled off to external of the system under refluxing n-heptane. Thereafter, 9.57 g of a 2% aqueous solution of ethylene glycol diglycidyl ether was added thereto, and the mixture was kept at 80° C. for 2 hours. Subsequently, n-heptane was evaporated, and the mixture was dried, to give 252.3 g of water-absorbent resin particles in an agglomerated form of the spherical particles. The secondary particles had a median particle size of 384 µm and a water content of 7.0%. The determination results of each property are shown in Table 1.

Example 4

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a hexaglyceryl monobehenylate having an HLB of 13.1 (manufactured by, Nippon Oil & Fats Co., Ltd., Nonion GV-106) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 18.4 mg of N,N'-methylenebisacrylamide were added thereto to dissolve, to prepare an aqueous monomer solution for the first step.

Setting the rotational speed of the stirrer at 450 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 73 µm.)

On the other hand, an another Erlenmeyer flask having a volume of 500 ml was charged with 128.8 g of an 80.5% by mass aqueous solution of acrylic acid, and 174.9 g of a 24.7% by mass aqueous sodium hydroxide was added dropwise thereto with cooling from external to neutralize 75% by mol. Thereafter, 0.16 g of potassium persulfate and 25.8 mg of N,N'-methylenebisacrylamide were added thereto to dissolve, to prepare an aqueous monomer solution for the second step, and the temperature of the solution was kept at about 20° C.

The rotational speed of stirring the above slurry after the polymerization was changed to 1000 rpm. Thereafter, the slurry was cooled to 20° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 269.7 g of water was distilled off to external of the system under refluxing n-heptane. Thereafter, 6.62 g of a 2% aqueous solution of ethylene glycol diglycidyl ether was added thereto, and the mixture was kept at 80° C. for 2 hours. Subsequently, n-heptane was evaporated, and the mixture was dried, to give 234.3 g of water-absorbent resin particles in an agglomerated form of the spherical particles. The secondary particles had a median particle size of 355 µm and a water content of 7.2%. The determination results of each property are shown in Table 1.

Example 5

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a hexaglyceryl monobehenylate having an HLB of 13.1 (manufactured by, Nippon Oil & Fats Co., Ltd., Nonion GV-106) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 18.4 mg of N,N'-methylenebisacrylamide were added thereto to dissolve, to prepare an aqueous monomer solution for the first step.

Setting the rotational speed of the stirrer at 500 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 55 µm.)

On the other hand, an another Erlenmeyer flask having a volume of 500 ml was charged with 156.4 g of an 80.5% by mass aqueous solution of acrylic acid, and 212.4 g of a 24.7% by mass aqueous sodium hydroxide was added dropwise thereto with cooling from external to neutralize 75% by mol. Thereafter, 0.19 g of potassium persulfate and 31.3 mg of N,N'-methylenebisacrylamide were added thereto to dissolve, to prepare an aqueous monomer solution for the second step, and the temperature of the solution was kept at about 20° C.

The rotational speed of stirring the above slurry after the polymerization was changed to 1000 rpm. Thereafter, the slurry was cooled to 20° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 299.1 g of water was distilled off to external of the system under refluxing n-heptane. Thereafter, 7.45 g of a 2% aqueous solution of ethylene glycol diglycidyl ether was added thereto, and the mixture was kept at 80° C. for 2 hours. Subsequently, n-heptane was evaporated, and the mixture was dried, to give 260.8 g of water-absorbent resin particles in an agglomerated form of the spherical particles. The secondary particles had a median particle size of 322 μm and a water content of 6.8%. The determination results of each property are shown in Table 1.

Example 6

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a hexaglyceryl monobehenylate having an HLB of 13.1 (manufactured by, Nippon Oil & Fats Co., Ltd., Nonion GV-106) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 18.4 mg of N,N'-methylenebisacrylamide were added thereto to dissolve, to prepare an aqueous monomer solution for the first step.

Setting the rotational speed of the stirrer to 600 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 43 μm.)

On the other hand, an another Erlenmeyer flask having a volume of 500 ml was charged with 119.6 g of an 80.5% by mass aqueous solution of acrylic acid, and 162.4 g of a 24.7% by mass aqueous sodium hydroxide was added dropwise thereto with cooling from external to neutralize 75% by mol. Thereafter, 0.14 g of potassium persulfate and 23.9 mg of N,N'-methylenebisacrylamide were added thereto to dissolve, to prepare an aqueous monomer solution for the second step, and the temperature of the solution was kept at about 25° C.

The rotational speed of stirring the above slurry after the polymerization was changed to 1000 rpm. Thereafter, the slurry was cooled to 25° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 259.8 g of water was distilled off to external of the system under refluxing n-heptane. Thereafter, 6.35 g of a 2% aqueous solution of ethylene glycol diglycidyl ether was added thereto, and the mixture was kept at 80° C. for 2 hours. Subsequently, n-heptane was evaporated, and the mixture was dried, to give 228.3 g of water-absorbent resin particles in an agglomerated form of the spherical particles. The secondary particles had a median particle size of 252 μm and a water content of 8.2%. The determination results of each property are shown in Table 1.

Example 7

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 9.2 mg of N,N'-methylenebisacrylamide were added thereto to dissolve, to prepare an aqueous monomer solution for the first step.

Setting the rotational speed of the stirrer at 350 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 110 μm.)

On the other hand, an another Erlenmeyer flask having a volume of 500 ml was charged with 119.6 g of an 80.5% by mass aqueous solution of acrylic acid, and 162.4 g of a 24.7% by mass aqueous sodium hydroxide was added dropwise thereto with cooling from external to neutralize 75% by mol. Thereafter, 0.14 g of potassium persulfate and 12.0 mg of N,N'-methylenebisacrylamide were added thereto to dissolve, to prepare an aqueous monomer solution for the second step, and the temperature of the solution was kept at about 28° C.

The rotational speed of stirring the above slurry after the polymerization was changed to 1000 rpm. Thereafter, the slurry was cooled to 28° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 255.2 g of water was distilled off to external of the system under refluxing n-heptane. Thereafter, 8.46 g of a 2% aqueous solution of ethylene glycol diglycidyl ether was added thereto, and the mixture was kept at 80° C. for 2 hours. Subsequently, n-heptane was evaporated, and the mixture was dried, to give 224.6 g of water-absorbent resin particles in an agglomerated form of the spherical particles. The secondary particles had a median particle size of 395 μm and a water content of 7.0%. The determination results of each property are shown in Table 1.

Example 8

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.28 g of hydroxyethylcellulose (manufactured by Sumitomo Seika Chemicals Co., Ltd., HEC AW-15F), 0.11 g of potassium persulfate, and 18.4 mg of N,N'-methylenebisacrylamide were added thereto to dissolve, to prepare an aqueous monomer solution for the first step.

Setting the rotational speed of the stirrer at 400 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 128 μm.)

On the other hand, an another Erlenmeyer flask having a volume of 500 ml was charged with 110.4 g of an 80.5% by mass aqueous solution of acrylic acid, and 149.9 g of a 24.7% by mass aqueous sodium hydroxide was added dropwise thereto with cooling from external to neutralize 75% by mol. Thereafter, 0.13 g of potassium persulfate and 11.0 mg of N,N'-methylenebisacrylamide were added thereto to dissolve, to prepare an aqueous monomer solution for the second step, and the temperature of the solution was kept at about 30° C.

The rotational speed of stirring the above slurry after the polymerization was changed to 1000 rpm. Thereafter, the slurry was cooled to 30° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 245.4 g of water was distilled off to external of the system under refluxing n-heptane. Thereafter, 8.10 g of a 2% aqueous solution of ethylene glycol diglycidyl ether was added thereto, and the mixture was kept at 80° C. for 2 hours. Subsequently, n-heptane was evaporated, and the mixture was dried, to give 213.9 g of water-absorbent resin particles in an agglomerated form of the spherical particles. The secondary particles had a median particle size of 482 μm and a water content of 6.4%. The determination results of each property are shown in Table 1.

Comparative Example 1

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 9.2 mg of N,N'-methylenebisacrylamide were added thereto to dissolve, to prepare an aqueous monomer solution for the first step.

Setting the rotational speed of the stirrer at 450 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Similarly to Example 1 till this time point, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 85 μm.)

On the other hand, an another Erlenmeyer flask having a volume of 500 ml was charged with 64.0 g of an 80.5% by mass aqueous solution of acrylic acid, and 86.9 g of a 24.7% by mass aqueous sodium hydroxide was added dropwise thereto with cooling from external to neutralize 75% by mol. Thereafter, 0.08 g of potassium persulfate and 6.4 mg of N,N'-methylenebisacrylamide were added thereto to dissolve, to prepare an aqueous monomer solution for the second step, and the temperature of the solution was kept at about 25° C.

The rotational speed of stirring the above slurry after the polymerization was changed to 1000 rpm. Thereafter, the slurry was cooled to 25° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 195.9 g of water was distilled off to external of the system under refluxing n-heptane. Thereafter, 6.24 g of a 2% aqueous solution of ethylene glycol diglycidyl ether was added thereto, and the mixture was kept at 80° C. for 2 hours. Subsequently, n-heptane was evaporated, and the mixture was dried, to give 163.4 g of water-absorbent resin particles in an agglomerated form of the spherical particles. The secondary particles had a median particle size of 202 μm and a water content of 6.2%. The determination results of each property are shown in Table 1.

Comparative Example 2

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.11 g of potassium persulfate and 9.2 mg of N,N'-methylenebisacrylamide were added thereto to dissolve, to prepare an aqueous monomer solution for the first step.

Setting the rotational speed of the stirrer at 500 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Similarly to Example 3 till this time point, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 60 μm.)

On the other hand, an another Erlenmeyer flask having a volume of 500 ml was charged with 211.6 g of an 80.5% by mass aqueous solution of acrylic acid, and 287.4 g of a 24.7% by mass aqueous sodium hydroxide was added dropwise thereto with cooling from external to neutralize 75% by mol. Thereafter, 0.25 g of potassium persulfate and 21.2 mg of N,N'-methylenebisacrylamide were added thereto to dissolve, to prepare an aqueous monomer solution for the second step, and the temperature of the solution was kept at about 25° C.

The rotational speed of stirring the above slurry after the polymerization was changed to 1000 rpm. Thereafter, the slurry was cooled to 25° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 353.4 g of water was distilled off to external of the system under refluxing n-heptane. Thereafter, 12.14 g of a 2% aqueous solution of ethylene glycol diglycidyl ether was added thereto, and the mixture was kept at 80° C. for 2 hours. Subsequently, n-heptane was evaporated, and the mixture was dried, to give 324.1 g of water-absorbent resin particles in an agglomerated form of the spherical particles. The secondary particles had a median particle size of 653 μm and a water content of 7.5%. The determination results of each property are shown in Table 1.

Comparative Example 3

The same procedures as in Example 1 were carried out except that the stirring rotational speed during the first-step polymerization was changed to 1000 rpm, to give 232.8 g of water-absorbent resin particles in an agglomerated form of the spherical particles. The secondary particles had a median particle size of 144 μm and a water content of 6.6%. The determination results of each property are shown in Table 1. (Incidentally, the slurry subjected to the first-step polymerization at a stirring rotational speed of 1000 rpm was subjected to azeotropic distillation of water and n-heptane using an oil bath at 120° C. to distill off only water to external of the system, and thereafter n-heptane was evaporated and the mixture was dried. The resulting spherical primary particles had a median particle size of 25 μm.)

Comparative Example 4

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.28 g of hydroxyethylcellulose (manufactured by Sumitomo Seika Chemicals Co., Ltd., HEC AW-15F), 0.11 g of potassium persulfate, and 9.2 mg of N,N'-methylenebisacrylamide were added thereto to dissolve, to prepare an aqueous monomer solution for the first step.

Setting the rotational speed of the stirrer at 350 rpm, the above aqueous monomer solution was added to the above separable flask, and the mixture was kept at 35° C. for 30 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 172 μm.)

On the other hand, an another Erlenmeyer flask having a volume of 500 ml was charged with 156.4 g of an 80.5% by mass aqueous solution of acrylic acid, and 212.4 g of a 24.7% by mass aqueous sodium hydroxide was added dropwise thereto with cooling from external to neutralize 75% by mol. Thereafter, 0.19 g of potassium persulfate and 15.6 mg of N,N'-methylenebisacrylamide were added thereto to dissolve, to prepare an aqueous monomer solution for the second step, and the temperature of the solution was kept at about 28° C.

The rotational speed of stirring of the above slurry after the polymerization was changed to 1000 rpm. Thereafter, the slurry was cooled to 28° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 294.3 g of water was distilled off to external of the system under refluxing n-heptane. Thereafter, 9.94 g of a 2% aqueous solution of ethylene glycol diglycidyl ether was added thereto, and the mixture was kept at 80° C. for 2 hours. Subsequently, n-heptane was evaporated, and the mixture was dried, to give 259.9 g of water-absorbent resin particles in an agglomerated form of the spherical particles. The secondary particles had a median particle size of 1122 μm and a water content of 5.8%. The determination results of each property are shown in Table 1.

Comparative Example 5

The same procedures as in Example 8 were carried out except that the composition of the aqueous monomer solution during the second-step polymerization was changed to 55.2 g of an 80.5% by mass aqueous solution of acrylic acid, 75.0 g of a 24.7% by mass aqueous sodium hydroxide, 0.07 g of potassium persulfate and 5.5 mg of N,N'-methylenebisacrylamide, and further the amount of dehydration by a reflux of n-heptane after the second-step polymerization was changed to 185.3 g, and the amount of a 2% aqueous solution of ethylene glycol diglycidyl ether after the dehydration was changed to 5.89 g, to give 155.0 g of water-absorbent resin particles in an agglomerated form of the spherical particles. The secondary particles had a median particle size of 302 μm and a water content of 6.2%. The determination results of each property are shown in Table 1.

Comparative Example 6

A cylindrical round bottomed separable flask having an internal diameter of 100 mm, equipped with a reflux condenser, a dropping funnel, a nitrogen gas inlet tube, and a stirring blade having a two-step four pitched paddle blades having a blade diameter of 50 mm as a stirrer was prepared. This flask was charged with 500 ml of n-heptane, and 1.38 g of a sorbitan monostearate having an HLB of 4.7 (manufactured by Nippon Oil & Fats Co., Ltd., SP-60R) and 0.46 g of a maleic anhydride-modified ethylene-propylene copolymer (manufactured by Mitsui Chemicals, Inc., Hi-wax 1105A) were added thereto. The temperature was raised to 80° C. to dissolve the dispersion stabilizers, and thereafter the solution was cooled to 50° C.

On the other hand, an Erlenmeyer flask having a volume of 500 ml was charged with 92 g of an 80.5% by mass aqueous solution of acrylic acid, and 154.1 g of a 20.0% by mass aqueous sodium hydroxide was added dropwise thereto with cooling from external to neutralize 75% by mol. Thereafter, 0.28 g of hydroxyethylcellulose (manufactured by Sumitomo Seika Chemicals Co., Ltd., HEC AW-15F), 0.11 g of potassium persulfate, and 9.2 mg of N,N'-methylenebisacrylamide were added thereto to dissolve, to prepare an aqueous monomer solution for the first step.

Setting the rotational speed of the stirrer at 370 rpm, the above aqueous monomer solution was added to the above separable flask, and the mixture was kept at 35° C. for 15 minutes while the internal of the system was replaced with nitrogen. Thereafter, the mixture in the flask was immersed in a water bath at 70° C. to raise the temperature, and the polymerization was carried out, to give a slurry after the first-step polymerization. (Incidentally, this slurry after the polymerization was subjected to azeotropic distillation of water and n-heptane using an oil bath at 120° C. to distill off only water to external of the system, and thereafter n-heptane was evaporated and the mixture was dried. The resulting spherical primary particles had a median particle size of 146 μm.)

On the other hand, an another Erlenmeyer flask having a volume of 500 ml was charged with 92 g of an 80.5% by mass aqueous solution of acrylic acid, and 124.9 g of a 24.7% by mass aqueous sodium hydroxide was added dropwise thereto with cooling from external to neutralize 75% by mol. Thereafter, 0.11 g of potassium persulfate and 9.2 mg of N,N'-methylenebisacrylamide were added thereto to dissolve, to prepare an aqueous monomer solution for the second step, and the temperature of the solution was kept at about 22° C.

The rotational speed of stirring the above slurry after the polymerization was changed to 1000 rpm. Thereafter, the slurry was cooled to 22° C., the above aqueous monomer solution for the second step was added to the internal of the system, and the mixture was kept for 30 minutes while the internal of the system was replaced with nitrogen.

Again, the flask was immersed in a water bath at 70° C. to raise the temperature, and the polymerization was carried out, to give a slurry after the second-step polymerization.

Subsequently, the temperature was raised using an oil bath at 120° C. and the slurry was subjected to azeotropic distillation of water and n-heptane, whereby 225.8 g of water was distilled off to external of the system under refluxing n-heptane. Thereafter, 7.36 g of a 2% aqueous solution of ethylene glycol diglycidyl ether was added thereto, and the mixture was kept at 80° C. for 2 hours. Subsequently, n-heptane was evaporated, and the mixture was dried, to give 195.1 g of water-absorbent resin particles in an agglomerated form of the spherical particles. The secondary particles had a median particle size of 478 μm and a water content of 5.9%. The determination results of each property are shown in Table 1.

TABLE 1

| | Median Particle Size of Primary Particles (d) (μm) | Ratio of Monomer in Second Step (%) | Median Particle Size of Secondary Particles (D) (μm) | Relationship Between (D) and (d) (5d/3 + 150 < D < 5d + 150) | Degree of Homogeneity of Particle Size Distribution | Retention of Particle Size After Impact Test (%) | Water Absorption Capability (g/g) | Water Absorption Capability Under Pressure (ml/g) | Retention of Water Absorption Capability Under Pressure (%) |
|---|---|---|---|---|---|---|---|---|---|
| Ex. 1 | 85 | 140 | 332 | 292 < D < 575 | 1.6 | 95 | 62 | 35 | 91 |
| Ex. 2 | 85 | 190 | 468 | 292 < D < 575 | 1.8 | 88 | 61 | 34 | 91 |
| Ex. 3 | 60 | 160 | 384 | 250 < D < 450 | 1.5 | 97 | 60 | 34 | 94 |
| Ex. 4 | 73 | 140 | 355 | 272 < D < 515 | 1.8 | 95 | 59 | 35 | 91 |
| Ex. 5 | 55 | 170 | 322 | 242 < D < 425 | 1.7 | 96 | 57 | 34 | 91 |
| Ex. 6 | 43 | 130 | 252 | 222 < D < 365 | 1.9 | 87 | 60 | 34 | 88 |
| Ex. 7 | 110 | 130 | 395 | 333 < D < 700 | 1.8 | 85 | 58 | 34 | 88 |
| Ex. 8 | 128 | 120 | 482 | 363 < D < 790 | 1.9 | 82 | 61 | 34 | 85 |
| Comp. Ex. 1 | 85 | 70 | 202 | —[1] | 2.3 | 75 | 62 | 34 | 75 |
| Comp. Ex. 2 | 60 | 230 | 653 | —[1] | 2.9 | 68 | 60 | 32 | 76 |
| Comp. Ex. 3 | 25 | 140 | 144 | —[1] | 2.4 | 85 | 58 | 31 | 71 |
| Comp. Ex. 4 | 172 | 170 | 1122 | —[1] | 3.0 | 72 | 59 | 34 | 70 |
| Comp. Ex. 5 | 128 | 60 | 302 | —[1] | 2.3 | 75 | 62 | 32 | 69 |
| Comp. Ex. 6 | 146 | 100 | 478 | 393 < D < 880 | 2.5 | 78 | 58 | 30 | 81 |

[1]Not satisfying the relationship

The water absorption capacity, the median particle size, the uniformity degree of particle size distribution, the retention rate of the particle size after particle collision test, the water absorption capacity under pressure, and the retention rate of the water absorption capacity under pressure after particle collision test, of the water-absorbent resin particles obtained in each Example and Comparative Example were determined in accordance with the following methods.

(Water Absorption Capacity)

A 500 mL beaker was charged with 500 g of 0.9% by mass saline, and thereto was added 2.0 g of the water-absorbent resin particles, and the mixture was stirred for 60 minutes. A mass Wa (g) of a JIS standard sieve having an opening of 75 μm was previously determined, and the content in the above beaker was filtered using this sieve. Then, the sieve was allowed to stand for 30 minutes in a state so that the sieve was tilted at a tilt angle of about 30 degrees to the horizontal to filter out excess water.

A mass Wb (g) of the sieve containing the water-absorbed gel was determined, and the water absorption capacity was obtained by the following formula:

$$\text{Water Absorption Capacity}(g/g)=(Wb-Wa)/2.0$$

(Median Particle Size of Primary Particles)

Into 50 g of the water-absorbent resin particles was mixed 0.25 g of an amorphous silica (manufactured by Degussa Japan Co., Ltd., Sipernat 200) as a lubricant.

JIS standard sieves, sieves having openings of 500 μm, 250 μm, 180 μm, 150 μm, 106 μm, 75 μm, and 38 μm, and a receiving pan were combined in order from the top. The above water-absorbent resin particles were placed on an uppermost sieve, and shaken for 20 minutes with a ro-tap shaker (a rotating and tapping shaker).

Next, the relationships between the opening of the sieve and an integral of a mass percentage of the water-absorbent resin particles remaining on the sieve were plotted on a logarithmic probability paper by calculating the mass of the water-absorbent resin particles remaining on each sieve as a mass percentage to an entire amount, and accumulating the mass percentages in order, starting from those having larger particle sizes. A particle size corresponding to a 50% by mass cumulative mass percentage was defined as a median particle size of the primary particles by joining the plots on the logarithmic probability paper in a straight line.

(Median Particle Size of Secondary Particles)

Into 100 g of the water-absorbent resin particles was mixed 0.5 g of an amorphous silica (manufactured by Degussa Japan Co., Ltd., Sipernat 200) as a lubricant.

In this determination, among 13 JIS standard sieves (sieves having openings of 2.36 mm, 1.7 mm, 1.4 mm, 850 μm, 600 μm, 500 μm, 355 μm, 300 μm, 250 μm, 180 μm, 106 μm, 75 μm, and 45 μm), consecutive 7 sieves are used.

The above water-absorbent resin particles were placed on the top of a sieve combined with sieves having openings of 600 μm, 500 μm, 355 μm, 300 μm, 250 μm, 180 μm, and 106 μm, and a receiving pan in order, and shaken for 20 minutes with a ro-tap shaker (a rotating and tapping shaker).

Next, the relationships between the opening of the sieve and an integral of a mass percentage remaining on the sieve were plotted on a logarithmic probability paper by calculating the mass of the water-absorbent resin particles remaining on each sieve as a mass percentage to an entire amount, and accumulating the mass percentages in order, starting from those having larger particle sizes. A particle size corresponding to a 50% by mass cumulative mass percentage was defined as a median particle size of the secondary particles by joining the plots on the logarithmic probability paper in a straight line.

When either the mass percentage of the water-absorbent resin remained on the uppermost sieve or that remained on the undermost tray exceeded 15.9%, the uniformity degree set forth below was not accurately obtained. Therefore, the combination of consecutive 7 sieves was reselected from the above sieves, and the median particle size was redetermined such that the mass percentage of the water-absorbent resins remained on the uppermost sieve and that remained on the undermost tray were 15.9% or lower.

(Uniformity Degree of Particle Size Distribution)

In the above determination of the median particle size of the secondary particles, a particle size corresponding to a 15.9% by mass cumulative mass percentage (X1) and a particle size corresponding to an 84.1% by mass cumulative mass percentage (X2) were obtained, and the uniformity degree was obtained by the following formula:

$$\text{Uniformity Degree} = X1/X2$$

In other words, when the particle size distribution is narrow, the uniformity degree gets close to 1, and when the particle size distribution gets wider, the uniformity degree gets larger than 1.

(Retention Rate of Particle Size after Particle Collision Test)

The retention rate of the particle size in particle collision test of the water-absorbent resin particles was obtained by determining the particle size distribution when the water-absorbent resin particles were collided to a collision plate using a testing apparatus X of which outline was shown in FIG. 1.

The testing apparatus X shown in FIG. 1 comprises a hopper (with a lid) 1, an pressurized air introduction tube 2, an injection nozzle 3, a collision plate 4, and a flowmeter 5. The pressurized air introduction tube 2 is introduced into the internal of the hopper 1, and the injection nozzle 3 is connected to the hopper 1. The pressurized air introduction tube 2 has an external diameter of 3.7 mm and an internal diameter of 2.5 mm. The injection nozzle 3 has an external diameter of 8 mm, an internal diameter of 6 mm, and a length of 300 mm. The collision plate 4 is made of SUS304 and has a thickness of 4 mm, and the distance between the end of the injection nozzle 3 and the collision plate 4 is fixed at 10 mm. The flowmeter 5 is adjusted such that the flow rate of pressurized air is 50 m/s at the end of the injection nozzle 3.

In the testing apparatus X having the constitution as described above, first, 100 g of water-absorbent resin particles 6 of which median particle size before collision (A1) has been previously determined is placed in the hopper 1, and the lid of the hopper 1 is closed. Subsequently, the pressurized air of which pressure was adjusted is introduced from the pressurized air introduction tube 2, and the water-absorbent resin particles 6 are injected from the injection nozzle 3 to the collision plate 4. Water-absorbent resins after injecting and colliding the entire amount are collected, and the particle size distribution is determined, to obtain a median particle size after collision (A2).

Using the resulting determined value, the retention rate of the particle size after particle collision test was obtained by the following formula:

$$\text{Retention Rate of Particle Size After Particle Collision Test}(\%) = [A2/A1] \times 100$$

(Water Absorption Capacity Under Pressure)

The water absorption capacity of water-absorbent resin particles under pressure was determined using a measuring apparatus Y shown in FIG. 2.

The measuring apparatus Y shown in FIG. 2 comprises a buret section 1, a lead tube 2, a measuring board 3, and a measuring section 4 placed on the measuring board 3. To the buret section 1 are connected a rubber plug 14 on the top of a buret 10, and an air introduction tube 11 and a cock 12 at the bottom portion of a buret 10, and further, the air introduction tube 11 has a cock 13 at the end. The lead tube 2 is attached between the buret section 1 and the measuring board 3. The lead tube 2 has a diameter of 6 mm. A hole of a diameter of 2 mm is made at the central section of the measuring board 3, and the lead tube 2 is connected thereto. The measuring section 4 has a cylinder 40 (made of Plexiglas), a nylon mesh 41 adhered to the bottom part of the cylinder 40, and a weight 42. The cylinder 40 has an inner diameter of 20 mm. The nylon mesh 41 has an opening of 75 μm (200 mesh), and water-absorbent resin particles 5 are evenly spread over the nylon mesh 41 upon the determination. The weight 42 has a diameter of 19 mm and a mass of 59.8 g. The weight is placed on the water-absorbent resin particles 5, so that a 2.07 kPa load can be applied to the water-absorbent resin particles 5.

Next, the determination procedures will be described. The determination is carried out in a room at 25° C. First, the cock 12 and the cock 13 at the buret section 1 are closed, and 0.9% by mass saline adjusted to 25° C. is poured from the top of the buret 10 and the top of the buret is plugged with the rubber plug 14. Thereafter, the cock 12 and the cock 13 at the buret section 1 are opened. Next, the height of the measuring board 3 is adjusted so that the level of surface of the 0.9% by mass saline flew out from a lead tube port in the central section of the measuring board 3 and the upper surface of the measuring board 3 are at the same height.

Separately, 0.10 g of the water-absorbent resin particles 5 is evenly spread over the nylon mesh 41 in the cylinder 40, and the weight 42 is placed on the water-absorbent resin particles 5, to prepare the measuring section 4. Subsequently, the measuring section 4 is placed so that its central section is in alignment with a lead tube port in the central section of the measuring board 3.

The volume reduction of 0.9% by mass saline in the buret 10, i.e., the volume of 0.9% by mass saline absorbed by the water-absorbent resin particles 5, Wc (ml), is read off from a time point where the water-absorbent resin particles 5 started absorbing water. The water absorption capacity of the water-absorbent resin particles 5 under pressure after 60 minutes passed from the beginning of the water absorption was obtained by the following formula:

$$\text{Water Absorption Capacity Under Pressure}(\text{ml/g}) = Wc/0.10$$

(Retention Rate of Water Absorption Capacity Under Pressure after Particle Collision Test)

One-hundred grams of water-absorbent resin particles of which water absorption capacity under pressure before particle collision test (B1) had been previously determined according to the method described in the above water absorption capacity under pressure was subjected to particle collision test, according to the above method described in the retention rate of the particle size after particle collision test.

Using the collected water-absorbent resin particles, the water absorption capacity under pressure was again determined according to the method described in the water absorption capacity under pressure, to obtain a water absorption capacity under pressure after particle collision test (B2).

Using the resulting determined value, the retention rate of the water absorption capacity under pressure after particle collision test was obtained by the following formula:

$$\text{Retention Rate of Water Absorption Capacity Under Pressure After Particle Collision Test}(\%) = [B2/B1] \times 100$$

(Water Content)

The amount 2 g of the water-absorbent resin particles was precisely weighed out (Wd (g)) in an aluminum foil case (No. 8) previously weighed. The above sample was dried for 2 hours with a forced convection oven (manufactured by ADVANTEC) set at an internal temperature of 105° C. Thereafter, the dried sample was allowed to be cooled in a desiccator, and a mass We (g) of the water-absorbent resin particles after drying was then determined. The water content of the water-absorbent resin particles was calculated by the following formula:

Water Content(%)=[Wd−We]/Wd×100

INDUSTRIAL APPLICABILITY

According to the production method of the present invention, water-absorbent resin particles having an appropriate particle size, a narrow particle size distribution, a high particle strength, and an excellent water absorption capacity under pressure can be obtained. The water-absorbent resin particles having the above-mentioned properties are suitably used in a hygienic material.

EXPLANATION OF NUMERICAL SYMBOLS

Figure 1:
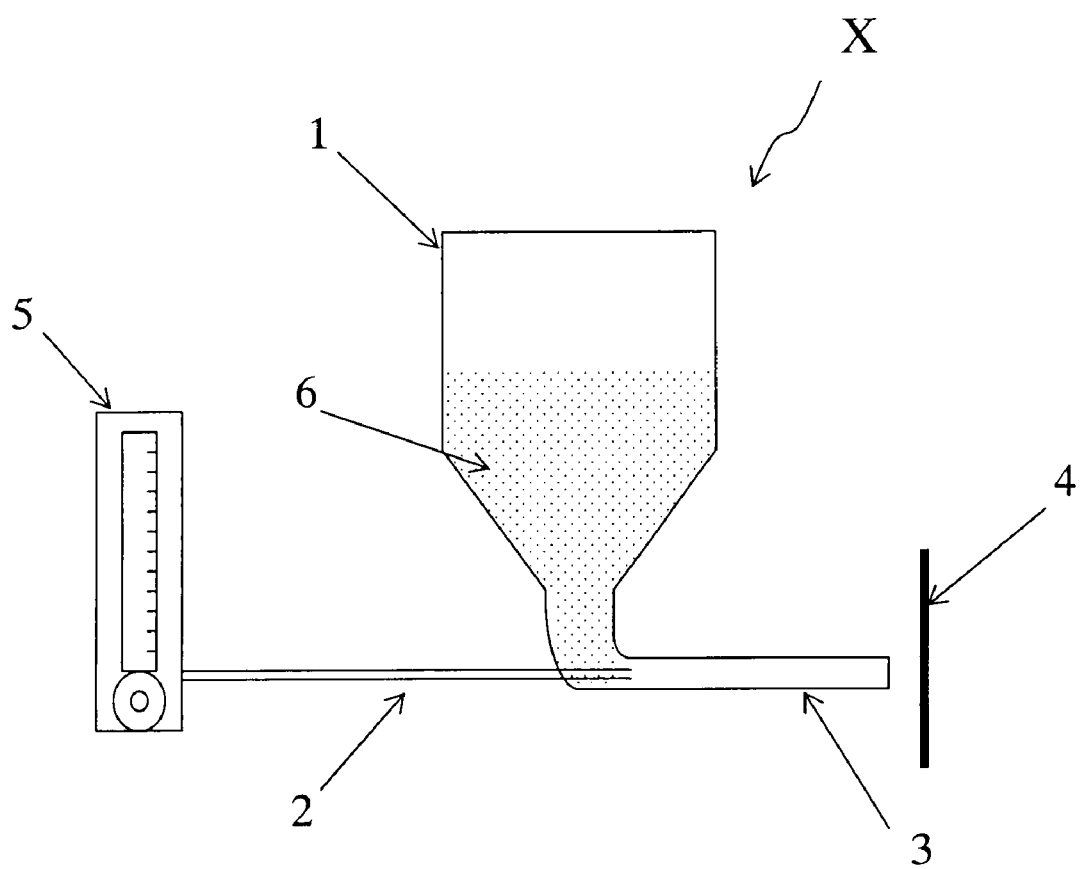
FIG. 1 A schematic view showing an outline of the constitution of an apparatus for conducting collision test.
Figure 2:
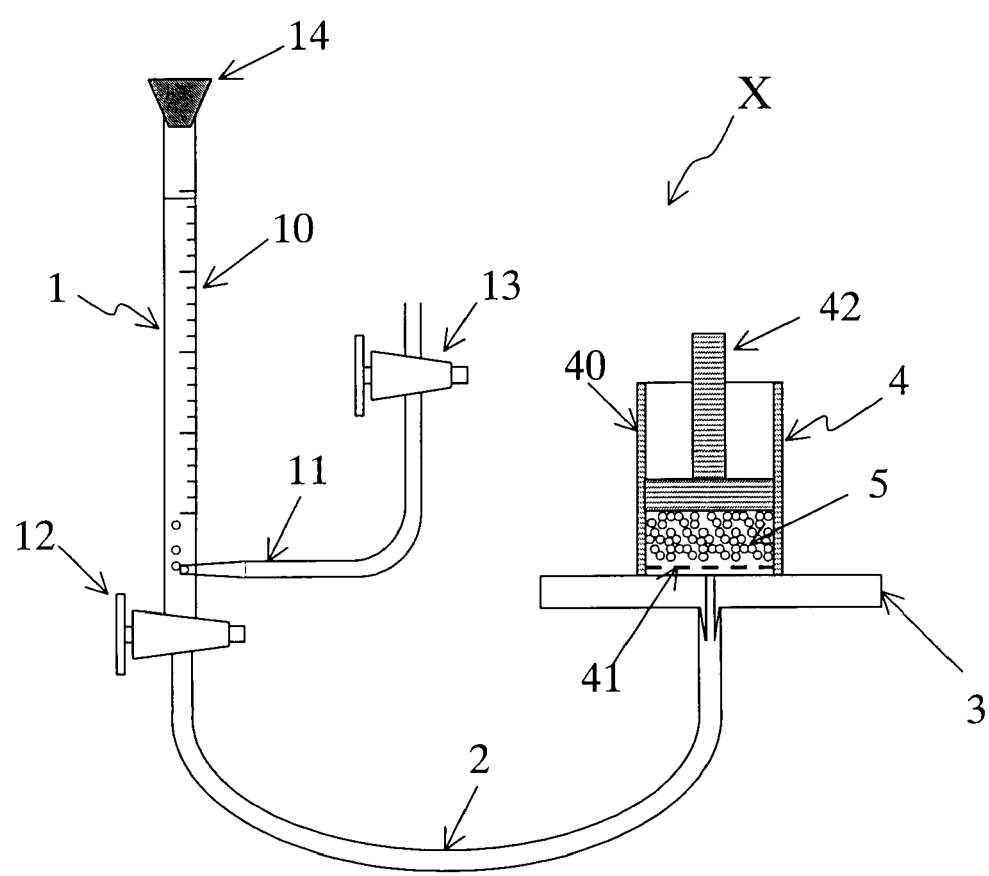
FIG. 2 A schematic view showing an outline of the constitution of an apparatus for determining the water absorption capacity under pressure.

X collision testing apparatus
1 hopper
2 pressurized air introduction tube
3 injection nozzle
4 collision plate
5 flowmeter
6 water-absorbent resin particles
Y measuring apparatus
1 buret section
10 buret
11 air introduction tube
12 cock
13 cock
14 rubber plug
2 lead tube
3 measuring board
4 measuring section
40 cylinder
41 nylon mesh
42 weight
5 water-absorbent resin particles

The invention claimed is:

1. A method of producing water-absorbent resin particles in which a median particle size of primary particles (d) and a median particle size of secondary particles (D) satisfy the relationship of the formula, $5d/3+150<D<5d+150$, comprising:

(1) subjecting a first water-soluble ethylenically unsaturated monomer to a first reversed phase suspension polymerization reaction, in a petroleum hydrocarbon solvent, in the presence of a surfactant as a first dispersion stabilizer and a polymeric dispersing agent as a second dispersion stabilizer, to give spherical primary particles having a median particle size (d) of from 30 to 130 μm, wherein the surfactant is at least one member selected from the group consisting of sucrose fatty acid esters and polyglycerol fatty acid esters;

(2) cooling the polymerization reaction solution, to precipitate the surfactant and the polymeric dispersing agent; and (3) carrying out a second reversed phase suspension polymerization reaction by adding to the polymerization reaction solution a second water-soluble ethylenically unsaturated monomer to agglomerate the primary particles, to give secondary particles having a median particle size (D) of from 200 to 500 μm, and wherein the water-absorbent resin particles in an agglomerated form have a retention rate of the particle size of 80% or more after particle collision test, and wherein the polymeric dispersing agent is a maleic anhydride-modified ethylene-propylene copolymer.

2. The method according to claim 1, wherein the first water-soluble ethylenically unsaturated monomer is acrylic acid, methacrylic acid, or an alkali metal salt thereof.

3. The method according to claim 1, wherein a post-crosslinking treatment is carried out by adding a crosslinking agent after the second reversed phase suspension polymerization reaction.

4. Water-absorbent resin particles in an agglomerated form of the spherical particles, obtained by the method as defined in claim 1, wherein the water-absorbent resin particles have a uniformity degree of particle size distribution of 1.2 to 2.2.

5. Water-absorbent resin particles in an agglomerated form of the spherical particles, obtained by the method as defined in claim 1, wherein the water-absorbent resin particles have a water absorption capacity of 30 ml/g or more under pressure before particle collision test and a retention rate of the water absorption capacity of 80% or more under pressure after particle collision test.

6. The method according to claim 1, wherein the second water-soluble ethylenically unsaturated monomer is acrylic acid, methacrylic acid, or an alkali metal salt thereof.

7. The method according to claim 1, wherein the surfactant is a sucrose fatty acid ester.

8. Water-absorbent resin particles in an agglomerated form of the spherical particles, obtained by the method as defined in claim 1.

* * * * *